United States Patent [19]

Heine et al.

[11] Patent Number: 5,435,378
[45] Date of Patent: Jul. 25, 1995

[54] APPARATUS FOR ACCURATELY HEATING AND COOLING ARTICLES

[75] Inventors: William W. Heine, Palatine; Dennis M. Craig, Des Plaines, both of Ill.

[73] Assignee: Process and Equipment Development, Inc., Palatine, Ill.

[21] Appl. No.: 710,116

[22] Filed: Jun. 4, 1991

[51] Int. Cl.[6] .............................................. F25B 29/00
[52] U.S. Cl. ........................................ 165/64; 165/61; 165/168; 228/180.1; 219/243; 219/85.16
[58] Field of Search ............................ 165/61, 64, 168; 228/179; 219/243, 85.16

[56] References Cited

U.S. PATENT DOCUMENTS

| | | |
|---|---|---|
| 1,343,014 | 6/1920 | Troutman . |
| 2,232,998 | 2/1941 | Cernohouz et al. . |
| 2,332,368 | 10/1943 | Burtenshaw ................ 219/85.16 |
| 2,435,170 | 1/1948 | Wachs et al. . |
| 2,743,347 | 4/1956 | Porter ............................ 165/168 |
| 3,382,342 | 5/1968 | Dix et al. ..................... 219/85.16 |
| 3,393,292 | 7/1968 | Ritscher .......................... 165/64 |
| 3,478,192 | 11/1969 | Fink .............................. 165/168 |
| 3,754,499 | 8/1973 | Heisman et al. ................ 219/243 |
| 3,765,475 | 10/1973 | Hooper ............................ 165/12 |
| 3,869,912 | 3/1975 | Horvath ......................... 165/168 |
| 3,941,297 | 3/1976 | Burns et al. ................... 228/179 |
| 4,548,259 | 10/1985 | Tezuka et al. ................... 165/14 |
| 4,593,182 | 6/1986 | Schwarzkopf .................. 219/544 |
| 4,609,037 | 9/1986 | Wheeler et al. .................. 165/61 |
| 4,888,973 | 12/1989 | Comley .......................... 219/243 |
| 5,158,132 | 10/1992 | Guillemot ........................ 165/64 |

OTHER PUBLICATIONS

Nicollian and Brews, MOS Physics and Technology, 1982, p. 625.
Signatone, Product Improvements and Updates—Brochure (no date).
Temprtonic, Model TP36 ThermoChuck System—Brochure (no date).
Wentworth Laboratories, TC-100 Tempchuck—Brochure (no date).
Micromanipulator, HMS Controller—Brochure (no date).

Primary Examiner—John K. Ford
Attorney, Agent, or Firm—Fitch, Even, Tabin & Flannery

[57] ABSTRACT

Disclosed is an apparatus for effecting precise thermal cycling of articles by alternately employing electrical heating elements and circulating cooling water in conjunction with a controller to accurately regulate the temperature of a working surface. The apparatus includes a thermal tray in which articles are mounted in recesses formed in the working surface region thereof. The thermal tray is removable from the base of the apparatus which houses the heating elements and cooling water. Thus, thermal trays are interchangeable atop the base as desired. Also disclosed is a weight assembly for maintaining the articles in the recesses. This allows the thermal tray of the present invention to be transported to each of a plurality of processing stations, including the aforementioned thermal processing atop the base, while still maintaining precise positioning of the articles throughout each of the processes.

11 Claims, 4 Drawing Sheets

APPARATUS FOR ACCURATELY HEATING AND COOLING ARTICLES

BACKGROUND OF THE INVENTION

1. Field of the Invention

This invention relates to an apparatus and method for conductive heating and cooling of articles, and more particularly, relates to an apparatus and method employing electrical heating elements in conjunction with circulating cooling water to effect accurate heating and cooling of articles.

2. Description of Related Art

There are currently a number of items on the market which alternately employ electrical heating elements and circulating cooling water to heat up and then cool down a working surface on which articles to be thermally processed are mounted. Such apparatus provide a unitary body having the heating elements and cooling water passageways formed therein. The unitary body includes a flat working surface region upon which articles to be thermally processed are mounted. The electrical heating elements are energized to heat up the unitary body to a desired temperature, including the working surface region thereof. Thereafter cooling water is circulated through the cooling water passageways to cool the unitary body, including the working surface region.

Such apparatus also include a temperature sensing device, such as a thermocouple, which sends electrical signals to a control unit indicating the temperature characteristics of the apparatus. Thereby, the control unit regulates the amount of power to the heating elements and the rate of cooling water flow, responsive to the electrical signals, to effect a predetermined thermal cycle or process.

Upon completion of the cooling cycle, the articles mounted to the working surface, which have already undergone the desired thermal processing, can then be removed and additional articles thereafter mounted on the working surface for subsequent thermal processing operations. With such apparatus, it is necessary to wait until the completion of the cooling cycle to remove thermally processed articles from the working surface of the apparatus and mount subsequent article for thermal processing. Since accurate positioning of articles on the working surface is often desired, which requires considerable time, there is a large downtime for such apparatus during the article loading period. It is desirable to provide such an apparatus which does not require waiting until the completion of the cooling cycle prior to loading subsequent articles on the working surface.

Additionally, it is often necessary to accomplish further processing objectives to the articles following the aforementioned thermal processing, wherein precise, repeatable location of parts in relation to one another is required from one process to the next. It is therefore desirable to provide a working surface region having means for maintaining articles in a precise position thereon during the aforementioned thermal processing, while providing for this precise positioning to be maintained during subsequent processing operations. This would provide considerable time savings in not having to accurately position the articles for each processing objective.

SUMMARY OF THE INVENTION

In accordance with the present invention, there is provided a heating and cooling apparatus having a removable tray onto which the articles are secured. The apparatus includes a unitary, solid base in which heating elements and cooling water passageways are disposed. A thermal tray having a working surface region is mountable on the base into thermal contact therewith and removable from the base as desired. Accordingly, while a first thermal tray is undergoing thermal processing with articles mounted thereto, a second thermal tray, which is removed from the base, can have articles mounted thereto at the same time. Articles are thermally processed or cycled by first energizing the heating elements to bring the thermal tray on which the articles are mounted to a predetermined temperature, then maintaining that temperature for a predetermined period, and finally circulating cooling water to rapidly lower the temperature of the tray and complete the thermal process or cycle. That is, by heating and cooling the base with electrical heating elements and cooling water, respectively, the thermal tray placed in thermal contact with the base is also heated and cooled and, therefore, the articles mounted to the base are heated and cooled therewith. Temperature sensing devices such as thermocouples or the like are employed which act in conjunction with a programmable control unit to assure accurate temperature regulation of the thermal tray.

Upon completion of the thermal processing of one set of articles, the thermal tray upon which those articles are mounted can then be completely removed from the base and a subsequent thermal tray, having another set of articles already mounted thereto, then inserted on the base for thermal processing. This provides a significant increase in the rate at which articles can be thermally processed, as compared with current apparatus which do not employ a removable tray. Typical examples of applications of the apparatus include void free soldering or brazing of semiconductor die to electronic packages and small mechanical assemblies, solder or low temperature braze sealing of small electronic components or packages, and the joining of parts or flat layered structures with epoxies or adhesives.

In accordance with one embodiment of the thermal tray aspect of the present invention, the thermal tray also includes a weight assembly associated therewith which biases articles against the thermal tray and maintains the articles in a precise location on the tray. Since the weight assembly is attached only to the thermal tray, and not to the base, the thermal tray can be removed from the base and transported to a subsequent station for further processing while still maintaining the precise location of the articles upon the tray. This also provides a significant increase in the production rate by eliminating the need to remove articles from the tray and accurately reposition them upon a subsequent tray for each separate process. For articles requiring several precise processing steps, the time savings realized by such a removable and interchangeable tray are quite substantial.

DESCRIPTION OF THE DRAWINGS

In the drawings, wherein like elements are referenced alike.

DETAILED DESCRIPTION OF THE PREFERRED EMBODIMENTS

Figure 1:
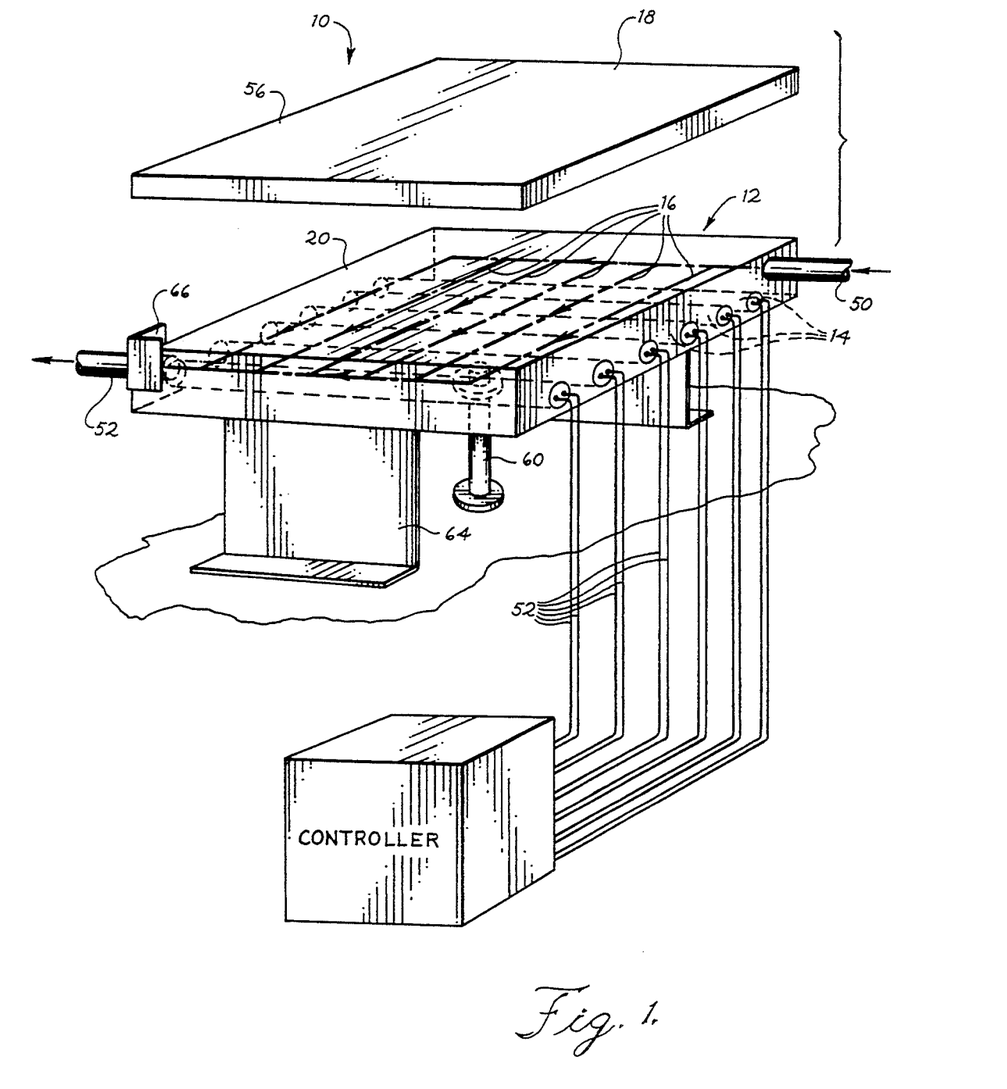
FIG. 1 is a perspective view of a heating and cooling apparatus embodying various features of the present invention.
Figure 2:
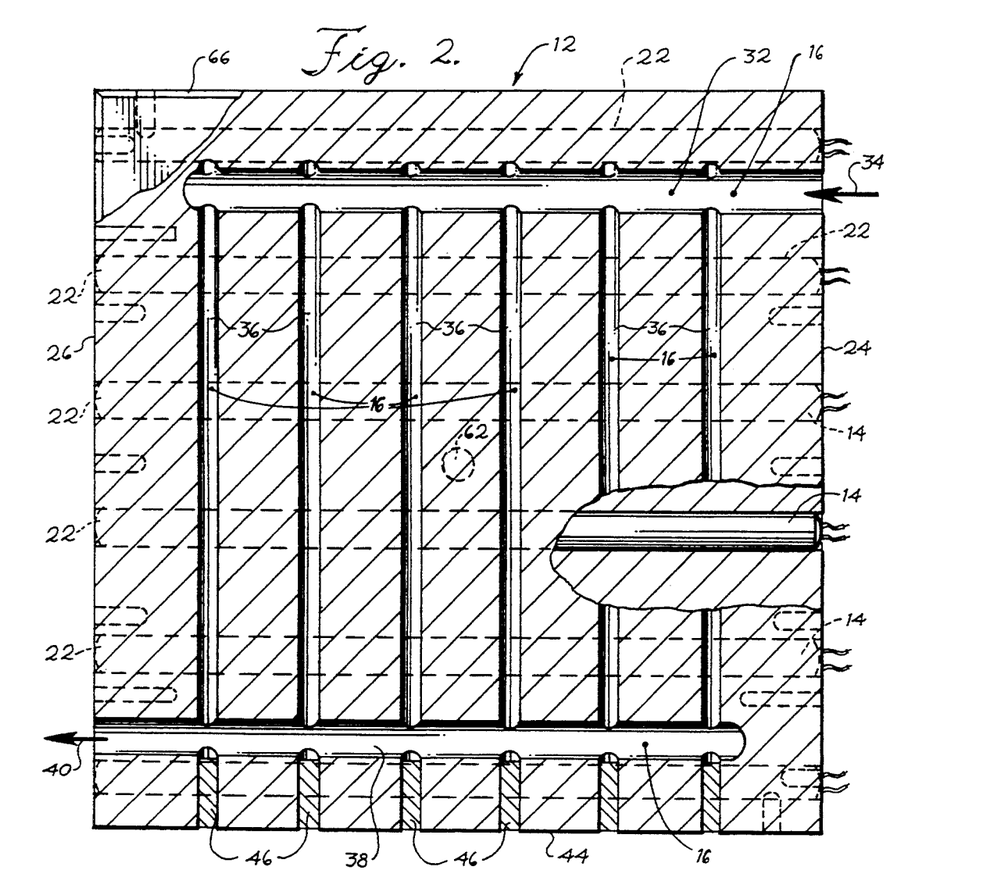
FIG. 2 is an enlarged plan view of the base portion of the heating and cooling apparatus of FIG. 1.
Figure 3:
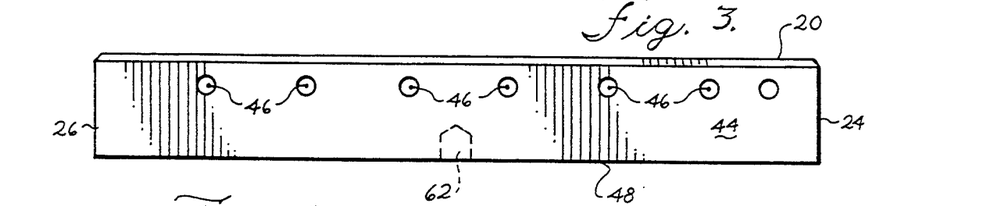
FIG. 3 is a front elevational view of the base shown in FIG. 2.
Figure 4:
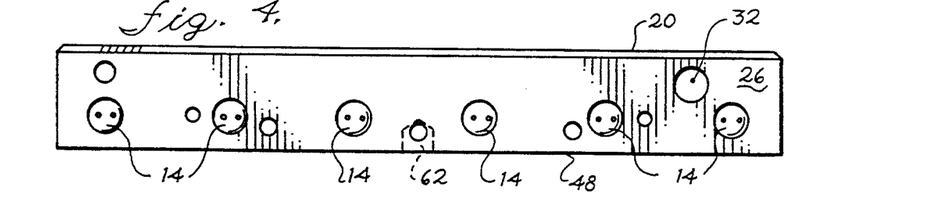
FIG. 4 is a side elevational view of the base shown in FIG. 2.

A heating and cooling apparatus embodying various features of the present invention is illustrated in FIG. 1 and referred to by the general reference character 10. The apparatus 10 includes a base 12 having a plurality of electrical heating elements 14 disposed therein. As best seen in FIG. 2, the base 12 further includes passageways 16 for the circulation of cooling fluid therethrough. The apparatus also includes a removable thermal tray 18 which is insertable onto the top 20 of the base 12 whereat it is in thermal contact with the base. Energization of the heating elements 14 in the base 12 effects heating of the thermal tray 18 placed in thermal contact with the base 12. Accordingly, by mounting articles to be thermally treated onto the thermal tray 18, and accurately controlling the rate of heating of the electrical heating elements 14, an accurate, predetermined heating cycle can be achieved for the articles. In the preferred embodiment, stainless steel tubes with nichrome wires are employed for the heating elements, however the type of heating element employed is not crucial and other heating elements are equally well suited for carrying out the present invention.

Upon completion of the desired heating cycle, the electrical heating elements 16 are de-energized and cooling water is circulated through the passageways 16 to cool the base 12 and thereby also cool the thermal tray 18 in thermal contact therewith. After the thermal tray 18 has cooled sufficiently, the articles mounted thereon can then be removed and a subsequent batch of articles mounted to the tray 18 and the aforementioned thermal cycling repeated to thermally process these articles. A particular advantage of the present invention is the removability aspect of the thermal tray 18. This allows for mounting of articles onto one thermal tray 18 at the same time that other articles mounted to another thermal tray 18 are undergoing thermal processing. Thus, it is not necessary with the heating and cooling apparatus 10 of the present invention to wait for completion of thermal cycling of one batch of articles prior to mounting articles for a subsequent thermal cycling. Since many applications require precise location of a large number of articles during mounting, which requires considerable time to be effected properly, significant time savings are realized by the ability to load one batch of articles while a previously loaded batch of articles are undergoing thermal cycling. Accordingly, significant cost and time savings are realized by the heating and curing apparatus 10 of the present invention.

With particular reference now to FIGS. 1-4, the base 12 will be more fully described. The base 12 is preferably generally a solid block formed of copper and, as best seen in FIG. 2, includes heating element passageways 22 formed therein (indicated in phantom) for accommodation of elongated electrical heating elements 14 and also includes cooling passageways 16 for the circulation of cooling fluid therethrough.

The heating element passageways 22 are proportioned to receive elongated, cylindrical heating elements and extend generally parallel to one another. The heating element passageways are open at a common lateral side 24 of the base 12 and closed adjacent the opposite lateral side 26. This allows individual electrical heating elements 14 to be inserted and removed from the base 12 so that the entire base 12 is not rendered inoperable from a malfunction of a single heating element 14. Also, the disposition of the heating elements within the base 12 minimizes heat loss. Accordingly, by energizing the electrical heating elements 14 disposed within the base 12, the base is heated, and hence the thermal tray 18 in thermal contact atop the base 12 is also heated, thereby heating the articles mounted on the thermal tray 18.

The base 12 further includes cooling passageways 16 for the circulation of cooling fluid following the desired heating period. The passage of cooling water through the cooling passageways 16 quickly lowers the temperature of the base 12 and thereby also the temperature of the thermal tray 18. In the preferred embodiment depicted in FIG. 2, the cooling passageways 16 are clearly shown. Cooling fluid enters the base 12 through an inlet header 32 in the direction of arrow 34, and traverses across the base 12 through smaller cross ducts 36, which connect with an outlet header 38 through which the fluid exits the base 12 in the direction of arrow 40. The cross ducts 36 are preferably formed by drilling in from the forward side 44 of the base 12 and thereafter press fitting, staking and brazing copper plugs 46 into the drilled openings to make the openings leaktight. Inlet piping 50 and outlet piping 52 of low thermal conductivity are brazed to the base 12 through which cooling fluid is respectively brought into and expelled from the base 12 (see FIG. 1). The connections to these lines are sufficiently far from the base 12 so as not to be significantly affected by the high temperature of the base 12.

As seen in FIGS. 1 and 2, the cooling passageways 16 are disposed in the base 12 at a location between the heating elements 14 and the upper surface 20 of the base 12 at which the thermal tray 18 is situated. Accordingly, any residual heat from the heating elements 14 remaining after completion of the desired heating cycle is removed by the cooling fluid passing through the cooling passageways 16 and thereby prevented from continuing to impart heat to the thermal tray 18. Also, to increase the rate of cooling of the thermal tray 18, it is desirable that the cooling fluid pass as near to the upper surface 20 of the base 12 as structurally possible. This arrangement permits rapid and accurate termination of the heating period for a given thermal cycle.

The base 12 is generally coated with a material such as nickel to provide a hard surface to reduce wear or mechanical damage to the base surfaces and to reduce damage due to corrosion such as oxidation.

The thermal cycling of articles mounted to the thermal tray 18 is controlled by a programmable controller, of the type known in the art. The heating rate and temperature profile, as a function of time, is controlled by a microprocessor based controller. Programmable Integral Differential (PID) controllers such as the "Honeywell DCP700" have been found well suited for carrying out the present invention. Such controllers allow "tuning" of the heating elements whereby the heating elements attain a desired, predetermined high temperature at a rapid rate without overshooting or exceeding the predetermined temperature. The desired temperature profile, or thermal cycle, is typically programmed into the controller. The actual temperature of the thermal tray 18 or the base 12, as measured by thermocouples or other suitable sensors, is compared to the stored, preprogrammed profile and the appropriate changes automatically made in the input power to the heating elements. That is, the thermal tray 18 or the base 12, or both the thermal tray and the base, may be provided with a recess 49 into which a thermocouple or other suitable sensor is received. The electrical signals generated by the thermocouple are fed into the controller together with the leads 52 of the heating elements 14, whereby the controller energizes the heating elements in a feedback and control manner to provide the desired temperature history to the thermal tray 18. In the preferred embodiment, the thermal tray 18 houses two or more thermocouples at various, well distributed locations thereacross, whereby accurate temperature distribution can be regulated. While the preferred embodiment provides for all of the heating elements to be energized and deenergized together as a single unit in order to reduce the cost of the apparatus, it is readily appreciated that other designs employing separately actuated heating elements could be employed, with separate heating elements being regulated based upon the signals from the sensor in that particular region, wherein cost savings are not a factor.

The thermal tray 18 is essentially an integral square or rectangular plate and is preferably formed of copper due to its high thermal conductivity and good heat diffusing characteristics. High thermal conductivity and good heat diffusing characteristics minimize local heating effects, resulting in greater temperature uniformity across the entire thermal tray. The thermal tray 18 and/or the base 18 may be plated with a suitable material, such as nickel or titanium oxide, to prevent the sticking of solder or braze materials thereto. The thermal tray 18 may be coated or treated to form a thin layer of material on the bottom and sides, with a material such as nickel, to provide a hard surface to reduce or prevent wear or physical damage or to reduce or prevent chemical damage, such as oxidation. The upper surface 56 of the thermal tray 18 may be coated with nickel for the same purpose or some other material which will affect similar protection but in addition will prevent solder or braze material from adhering to the thermal tray working surface, or to make cleaning or removal of adhesives more effective.

In addition to the recesses 49 formed in the working surface of the thermal tray 18 for accommodation of thermocouples as discussed above, the thermal tray 18 may further include article engaging recesses 54 formed therein as shown in the illustrated embodiment. The article engaging recesses 54 are uniformly distributed across the center region or working surface region of the upper surface 56 of the thermal tray 18, across which the temperature distribution is maintained very uniform.

No article engaging recesses 54 are formed near the edges of the thermal tray 18 since the temperature distribution thereat is not uniform due to edge effects. In a prototype design having a thermal tray with a 34 square inch area, the outer 1 inch along each of the edges was found to experience edge effects and therefore lack of temperature uniformity. Contrariwise, the "working surface" region, which is the region interior of the edge regions, was found to attain a temperature uniformity of $+/-3°$ Celsius while heated to a temperature of 400° Celsius.

Figure 5:
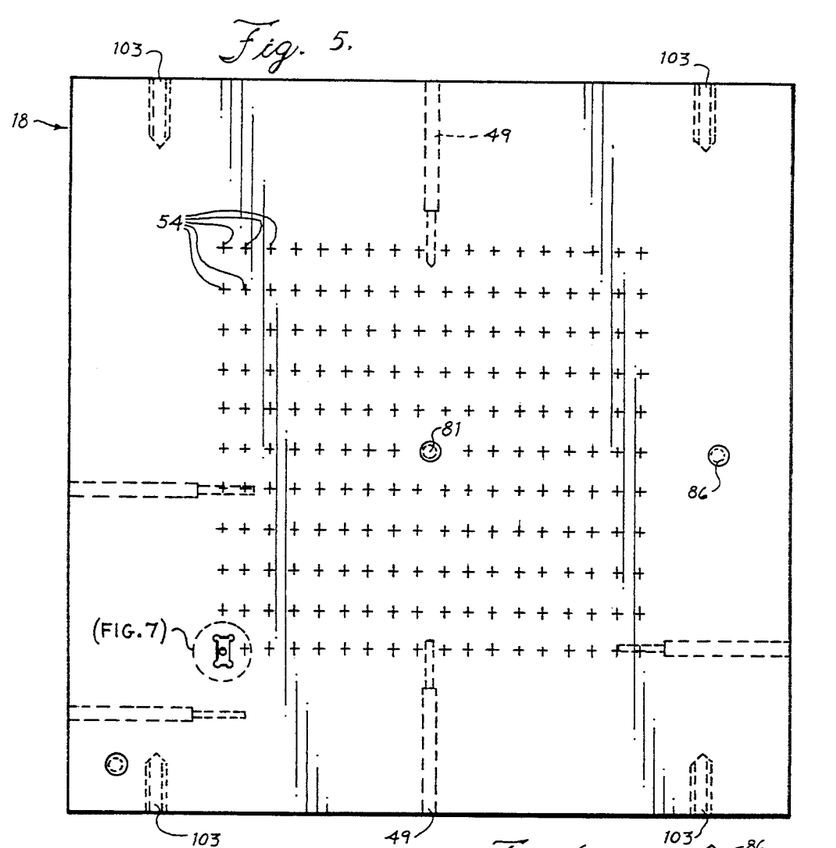
FIG. 5 is an enlarged top plan view of the thermal tray portion of the heating and cooling apparatus shown in FIG. 1.
Figure 6:
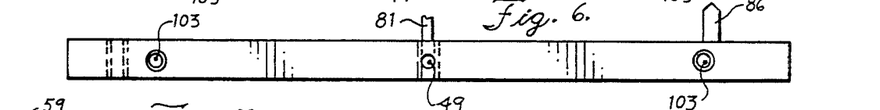
FIG. 6 is a front elevational view of the thermal tray shown in FIG. 5.
Figure 7:
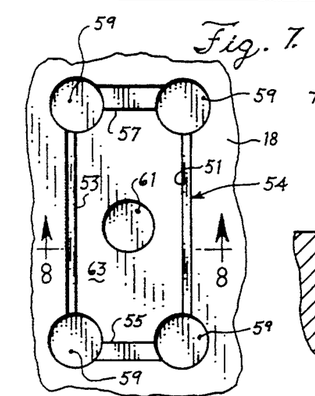
FIG. 7 is an enlarged plan view of a typical one of the article engaging recesses in the thermal tray shown in FIG. 5.
Figure 8:
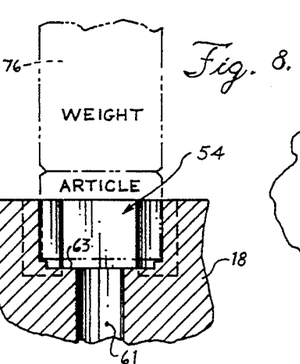
FIG. 8 is a cross-sectional view of the article engaging recess taken along line 8—8 of FIG. 7.
Figure 9:
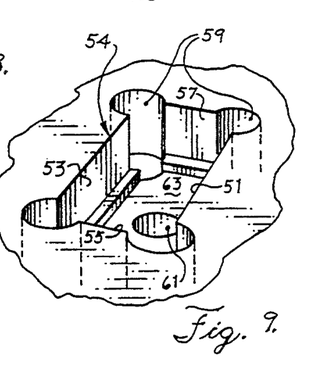
FIG. 9 is a perspective view of the article engaging recess shown in FIG. 7.

In the illustrated embodiment shown in FIG. 5, 196 article engaging recesses 54, the enlarged detail of which is shown in FIGS. 7-9, are uniformly distributed across the central working surface region of the thermal plate 18. As also illustrated in FIG. 5, the temperature sensing tip of at least one of the thermocouples should extend into the working surface region, since this is the region at which articles are mounted to the tray.

With reference now to FIGS. 7-9, the preferred configuration of the recesses 54 is illustrated. Since it is difficult and expensive to machine recesses with perfectly square corners, the recesses are formed by a first rough machining which defines front and rear sidewalls 51 and 53, and lateral sidewalls 55 and 57 but leaves the corners 59 rounded. Then a second machining at each of the corners 59 of the recesses 54 forms rounded recesses at the corners 59. The rounded recesses at the corners 59 is best seen in FIG. 9. In addition to being an inexpensive method of forming the recesses 54, the rounded recesses at the corners 59 allows for insertion of a tool thereat to remove articles following thermal processing. To further assist in the removal of articles from the recesses 54, the recesses 54 include a central aperture 61 therein which extends through the thermal tray 18 to allow pushing out of articles from the underside of the recesses 54.

Articles to be thermally processed are placed in the recesses 54 manually with the articles resting on the bottom wall 63 and supported by the front sidewall 51, rear sidewall 53, lateral sidewall 55 and lateral sidewall 57. The articles may extend above, below or level with the upper surface 56 of the thermal tray 18. While manual article loading is preferable due to the reduced equipment cost associated with not having automated loading equipment, it is readily appreciated that automated article loading may be desirable for certain applications and automated article loading is contemplated as falling within the scope of the invention.

Figure 10:
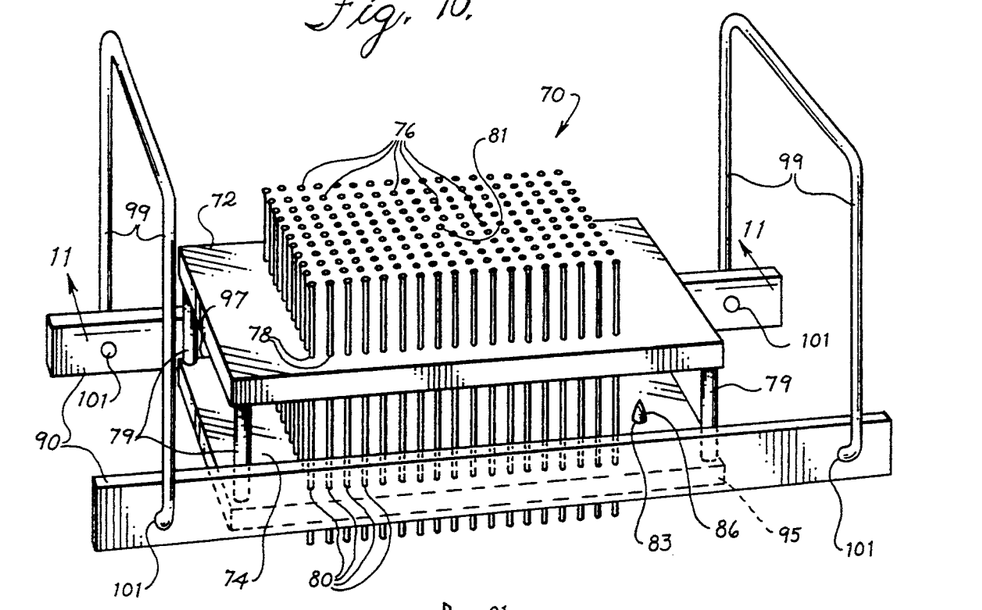
FIG. 10 is a perspective view of the heating and cooling apparatus of FIG. 1 with a weight assembly for securing articles associated therewith.
Figure 11:
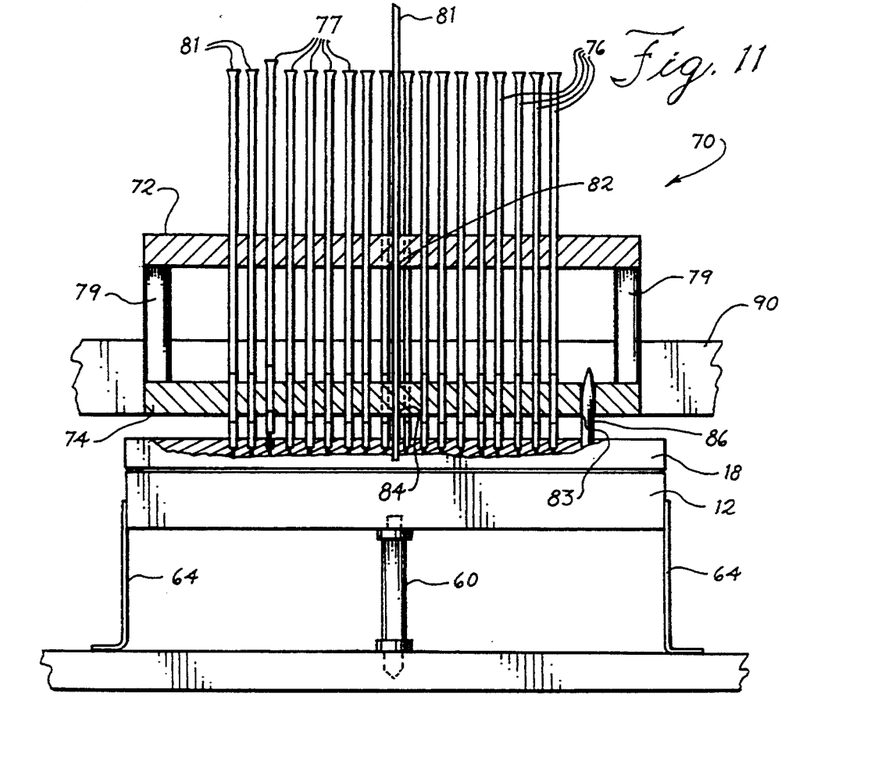
FIG. 11 is a partial cross-sectional view of the heating and cooling apparatus with the weight assembly, taken along the line 11—11 of FIG. 10.

To assist in maintaining articles in their respective recesses 54, a weight assembly is used in conjunction with the removable thermal tray 18. With reference now to FIGS. 10 and 11, the weight assembly is illustrated and referred to generally at 70. The weight assembly 70 also allows a thermal tray 18, having articles secured thereto by the weight assembly 70, to be removed from the base 12 without disturbing the precise positioning of the articles. Accordingly, the weight assembly 70 allows the thermal tray 18 to be transported to each of a number of processing stations, whereat different processing objectives are met, while maintaining precise positioning of articles on the thermal tray 18 throughout the various processing steps.

The weight assembly 70 includes two parallel plates, an upper plate 72 and a lower plate 74, which serve to support and guide a plurality of small weights 76. That is, the upper plate 72 includes a plurality of apertures 78 which are maintained in registration above a plurality of apertures 80 provided in the lower plate 74, with rod-like weights 76 extending through the apertures of the upper plate 72 and lower plate 74. The upper plate 72 and lower plate 74 are maintained in registration with respect to one another by four connecting posts 79 extending between the plates. The weights 76 are freely slidable within the apertures 78 and 80 between raised and lowered positions. The weight assembly 70 rests on top of the thermal tray 12 with the weights 76 falling downward under the influence of gravity and resting atop the articles mounted in the recesses 54. The end of each weight 76 in contact with each article may be as small of a diameter as possible (including near single point contact) so long as there is no damage caused to the article under its influence, in order to minimize heat transfer from the article being processed to the weight. The weight 76 may also be fabricated from a material of relatively poor thermal conductivity to further reduce heat loss from the article being processed. These details contribute to a shorter cycle time than would otherwise be possible. Since each of the weights 76 is freely slidable independent of the other weights, equal weighting of all the articles mounted on the thermal tray 18 is realized regardless of size differentials amongst the articles. Enlargement 77 of the weight diameter above the lower support plate 74 of the weight assembly prevents the weights from passing completely through the upper plate apertures 78, and falling out of the weight assembly 70, upon lifting of the weight assembly.

In one embodiment of the invention, the thermal tray 18 includes an elongated alignment rod 81 extending upward from near the center of the tray and a shorter alignment pin 86 also extending upward from the tray 18, whereby the two alignment members 81 and 86 serve to assure maintenance of accurate alignment of the weight assembly 70 with respect to the thermal tray 18. The upper plate 72 and the lower plate 74 both include a centrally located aperture, 82 and 84 respectively, whereby the weight assembly 70 is moved until the alignment rod 81 of the thermal tray 18 is received within the alignment apertures 82 and 84 of the upper plate 72 and the lower plate 74 to assist in aligning the weight assembly 70 with respect to the thermal tray 18.

The final registration is achieved by rotating the weight assembly 70 about the alignment rod 81 and lowering the weight assembly 70 until the shorter alignment pin 86 is received within the pin aperture 83 provided in the lower plate 74. The combination of the two alignment members, alignment rod 81 and alignment pin 86, serves to maintain the weight assembly 70 at a desired stationary location with respect to the thermal tray 18. Thus, each weight 76 rests atop a respective thermal tray recess 54 to maintain the articles in their respective recesses 54.

From the foregoing, it will be appreciated that articles held in place by the weight assembly 70 will remain held in place regardless of a minor size differential of one or more articles relative to the other articles and regardless of where the thermal tray 18 is moved. Thus, the same thermal tray 18, with articles mounted thereto and secured by the weight assembly 70, is transportable to subsequent processing stations, and there is no need to remove the articles following thermal processing on the thermal tray 18 and to remount the articles for the subsequent processing objectives. The weight assembly 70 assures the maintenance of accurate positioning of articles with respect to the thermal tray 18 and accurate positioning of article components with respect to one another even when the thermal tray 18 is raised and lowered from the base 12, thus allowing articles mounted on the thermal tray to be transported to different processing stations while still maintained in an accurate position upon the thermal tray 18.

The weight assembly 70 further includes two generally parallel frame members 90 which are connected to the front side 95 and rear side 97 of the bottom plate 74, as best seen in FIG. 10. The frame members 90 provide means for raising and lowering the weight assembly 70. That is, handles 99 are engageable in the apertures 101 provided in the frame members 90 by which the frame members 90, and the remainder of the weight assembly 70 connected thereto, can be manually raised an lowered. While the weight assembly 70 can be raised and lowered without the handles 99, the handles are desirable for applications in which the thermal processing is to take place in a process chamber having a controlled environment, such as vacuum or inert gas, and the apparatus must be lowered into the chamber. Also, in applications wherein it is desirable to remove the weight assembly 70 from the thermal tray 18 immediately following thermal processing, while the weight assembly is still hot, the ability to remove the handles 99 from the frame member apertures 101 during thermal processing and reinsert the handles 99 following processing provides cool handles 99 by which the weight assembly can be raised.

With reference to FIG. 5, the thermal tray 18 also includes handle apertures 103 at which handles 99 are detachably insertable. Removability of the handles 99 allows the thermal tray 18 to undergo thermal processing while the handles are removed, so that the handles remain cool, with the cool handles thereafter being inserted into the handle apertures 103 of the heated thermal tray 18 following thermal processing to raise the thermal tray 18 from the base 12.

The apparatus 10 of the present invention lends itself to automation. Any of various robotic apparatus known in the art can be employed to automatically load articles into the recesses 54 of the thermal tray 18 and thereafter place the thermal tray 18 in registration atop the base 12. Accordingly, a plurality of thermal trays 18 can be inserted and removed from the base 12 in an automated process.

The weight assembly 70 also lends itself to automation. In accordance with one aspect of the present invention, a hydraulic cylinder or the like can be employed to raise and lower the weight assembly 70 onto and off of the base 12. This allows the weight assembly to be automatically raised off of the base 12 following a thermal processing, wherein no further processing steps are desired, to allow removal of the articles. In accordance with another aspect of the present invention, the weight assembly 70 is maintained in registration with the thermal tray 18 upon raising of the thermal tray 18 from the base 12, thereby maintaining the articles mounted to the tray in a precise, stationary position.

Thus, there is no need for additional equipment to assist in maintaining the articles in position on the thermal tray 18, nor to assist in maintaining registration between the weight assembly 70 and the thermal tray 18 during an automated process in which the thermal tray 18 is raised and lowered from the base 12.

To help maintain uniform temperature distribution and minimize heat loss effects, the base 12 is supported upon a single central column 60 of relatively poor thermal conductivity in the center of the block which provides horizontal stability and primary vertical support. The central column 60 is threaded and engages with a complementary threaded recess 62 provided in the base 12. Two thin side supports 64, also of poor thermal conductivity, provide resistance to rotation about the central column 60, flexibility to allow for thermal expansion of the base 12, and leveling of the base 12. The side supports 64 are shown in FIG. 1 as being connected to the bottom of the base 12, however the side supports may alternatively be connected to the sides of the base. Accordingly, it is preferred that the base 12 be anchored in a stationary, level position with the thermal tray or trays 18 raised and lowered onto the upper surface 20 of the base 12. Accurate registration of the thermal tray 18 onto the base 12 is assisted by corner brackets 66 mounted to two or more corners of the base 12, only one of which is shown in FIG. 1 for simplicity. As stated above, it is preferred that both the base 12 and the thermal tray 18 be formed of copper; however, in applications wherein copper is cost prohibitive or otherwise undesirable, the materials for the base 12 and the thermal tray 18 should be selected so that the thermal coefficient of expansion of the base and the thermal tray are generally equal. This minimizes warpage and wear effects on the apparatus 10 which may otherwise be substantial. As also discussed above, the side supports 64 are provided to allow for thermal expansion of the base 12 without distortion effects.

In operation, articles to be thermally processed are loaded onto a thermal tray 18 and the tray then inserted in registration atop the base 12, with the corner brackets 66 assisting in achieving proper alignment. Any water in the cooling passageways 16 is cleared therefrom. The controller, which has been preprogrammed to achieve a predetermined temperature profile, is then actuated, thereby energizing the heating elements 14 to heat the thermal tray 18 and the articles mounted thereto. The controller acts in conjunction with feedback signals from the thermocouples disposed within the apparatus to accurately control the temperature of the thermal tray 18. Following sustainment of the desired temperature for a desired processing period, the thermal tray 18 is then rapidly cooled by passing cooling fluid through the cooling passageways 16. Upon attainment of sufficient cooling, the thermal tray 18 is then removed from the base 12 and the thermally processed articles removed therefrom. At this point either a second thermal tray 18 having articles mounted thereto can be inserted onto the base 12 to undergo thermal cycling, or else the thermal tray just removed can be reinserted onto the base 12 after the processed articles have been removed. The time savings realized by utilization of more than one thermal tray is discussed above, and the preferred method of operation includes utilization of two or more thermal trays 18. For applications in which articles are to undergo additional processing steps following thermal cycling, wherein maintenance of precise positioning of the parts from one stop to the next is required, the weight assembly 70 is engaged with the thermal tray 18 in the manner discussed above.

A prototype model constructed in accordance with the present invention was found to attain a temperature of 400° Celsius in less than ten minutes with a temperature uniformity in the work area of +/−3° Celsius. The plate was then cooled to room temperature in a few minutes. A complete thermal cycle for a 340° Celsius soldering operation was performed in less than twenty minutes. Working surface areas up to approximately 34 square inches have been tested, and no upper limit to plate size has been encountered. Upon interruption of heating, the thermal tray 18 and base 12 will cool at less than 2° Celsius per minute in the absence of cooling water circulation. No physical clamping or thermal greases were found necessary to attain the aforementioned good temperature uniformity and rapid heat up and cool down rates. Thus, the interchanging of thermal trays 18 containing articles is as simple as lifting a tray 18 off the base 12 and placing another tray 18 on the base 12.

While the invention has been described with reference to a preferred embodiment, it will understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for heating and cooling articles, comprising:
   an integral base defining a plurality of internal cooling fluid passageways and having a plurality of heating elements disposed therein;
   a thermal plate having a working surface region with means for receiving said articles and being freely supportable on said base to allow manual movement of said thermal plate without the aid of tools between a first position in which the thermal plate is in operative thermal contact with said base and a second position in which the thermal plate is at a location remote from said base, to allow loading of said articles onto said thermal plate at a location remote from said base;
   temperature sensing means disposed in said apparatus for generating electrical signals indicating the temperature of said articles; and
   control means for controlling the power to the heating elements and the rate of cooling fluid through said passageways responsive to said electrical signals to effect a predetermined temperature cycle of said working surface region of said thermal plate with the temperature being substantially uniform over the entire working surface region of the thermal plate.

2. An apparatus in accordance with claim 1 wherein said temperature sensing means includes at least one temperature sensing device disposed to respond to the temperature of said thermal plate of said apparatus.

3. An apparatus in accordance with claim 1 wherein said temperature sensing means includes at least one temperature sensing device disposed to respond to the temperature of said base of said apparatus.

4. An apparatus in accordance with claim 1 wherein said temperature sensing means includes at least one temperature sensing device disposed in said thermal plate and said base.

5. An apparatus in accordance with claim 1 wherein said cooling fluid passageways are disposed between said heating elements and said thermal plate.

6. An apparatus in accordance with claim 1 wherein said base includes alignment means for aligning said thermal plate with respect to Said base to assure proper thermal contact therebetween.

7. An apparatus in accordance with claim 1 wherein said working surface region includes one or more article engaging means for engaging said articles in a stationary position in thermal contact with said working surface region during heating and cooling of said thermal plate.

8. An apparatus in accordance with claim 7 wherein said article engaging means includes recesses in said thermal plate working surface region.

9. An apparatus in accordance with claim 1 wherein said thermal plate is formed of one or more materials having thermal conductivity and diffusivity at least as great as that of copper to effect substantially uniform temperature distribution thereacross.

10. An apparatus in accordance with claim 1 wherein said thermal plate includes a weight assembly for biasing said articles against said working surface region of the tray.

11. An apparatus for heating and cooling articles in a batch operation, comprising:

a base;

a first thermal plate disposable in thermal contact with said base and having a working surface region with means for receiving said articles;

a second thermal plate disposable in thermal contact with said base and having a working surface region with means for receiving said articles;

heating and cooling means disposed within said base for effecting a predetermined temperature cycle of said working surface region of one of said first and second thermal plates disposed in thermal contact with said base; and both said first and second thermal plates having means for manual engagement and removal from said base without the use of tools, a first plurality of said articles being mountable onto said first thermal plate at a remote location out of thermal contact with said base while said second thermal plate with a second plurality of articles mounted thereon is engaged with said base and undergoing said predetermined temperature cycle, and said first thermal plate being subsequently manually removable from said base following said predetermined temperature profile and said second thermal plate with said second plurality of articles mounted thereon being manually engageable with said base for thermal cycling of said second plurality of said articles.

* * * * *